Feb. 20, 1962  G. A. SCHARP  3,022,505
LOADED DOUBLE-FOLDED SLOT ANTENNA
Filed March 29, 1960  6 Sheets-Sheet 1

INVENTOR.
GLENN A. SCHARP
BY
ATTORNEYS.

| L/W | $W_f/W_d$ | $S_{o2}$ (wavelengths) | $R_{o2}/2$ (ohms) | $L_{o2}$ (wavelengths) | % Bandwidth for 90% Power Radiated |
|---|---|---|---|---|---|
| 8.2 | 0.029 | 0.0228 | 145 | 0.384 | 20 |
| | 0.071 | 0.0220 | 79 | 0.370 | 17 |
| | 0.100 | 0.0217 | 65 | 0.364 | 17 |
| | 0.167 | 0.0213 | 53 | 0.358 | 15 |
| | 0.500 | -- | -- | -- | -- |
| | 1.50 | -- | -- | -- | -- |
| | 0.167 | 0.0207 | 54 | 0.377 | 22 |
| | 0.500 | -- | -- | -- | -- |
| | 1.50 | -- | -- | -- | -- |
| | 0.500 | -- | -- | -- | -- |
| 13.67 | 0.125 | -- | -- | -- | -- |
| | 0.167 | -- | -- | -- | -- |
| | 0.500 | -- | -- | -- | -- |
| | 1.50 | -- | -- | -- | -- |
| 20.5 | 0.167 | 0.0072 | 43 | 0.316 | 10 |
| 20.5 | 1.50 | -- | -- | -- | -- |
| 41 | 0.500 | -- | -- | -- | -- |

L = 20.5"

Dumbbell diameter = 5"

FIG. 3

Feb. 20, 1962        G. A. SCHARP              3,022,505
                LOADED DOUBLE-FOLDED SLOT ANTENNA
Filed March 29, 1960                    6 Sheets-Sheet 3

INVENTOR.
GLENN A. SCHARP
BY
*J. M. St. Amand*
ATTORNEYS.

Feb. 20, 1962 G. A. SCHARP 3,022,505
LOADED DOUBLE-FOLDED SLOT ANTENNA
Filed March 29, 1960 6 Sheets-Sheet 4

INVENTOR.
GLENN A. SCHARP
BY
J. M. St. Amand
ATTORNEYS.

| $W_f/W_d$ | $S_{o2}$ (wavelengths) | $R_{o2}/2$ (ohms) | $L_{o2}$ (wavelengths) | % Bandwidth for 90% Power Radiated |
|---|---|---|---|---|
| 0.033 | 0.0267 | 158 | 0.439 | 16 |
| 0.045 | 0.0265 | 120 | 0.435 | 16 |
| 0.071 | 0.0261 | 120 | 0.439 | 16 |
| 0.100 | 0.0264 | 83 | 0.433 | 14 |
| 0.100 | 0.0260 | 87 | 0.437 | 17 |
| 0.100 | 0.0257 | 100 | 0.440 | 18 |
| 0.167 | 0.0254 | 78 | 0.440 | 14 |
| 0.250 | 0.0257 | 47.5 | 0.433 | 16 |
| 0.250 | 0.0246 | 59 | 0.437 | 18 |
| 0.250 | 0.0237 | 61 | 0.437 | 19 |
| 0.500 | 0.0209 | 31 | 0.418 | 27 |
| 1.000 | 0.0243 | 26 | 0.432 | 19 |
| 1.000 | 0.0212 | 24.5 | 0.423 | 21 |
| 1.000 | -- | -- | -- | -- |
| 2.500 | 0.0243 | 7 | 0.518 | -- |
| 5.500 | -- | -- | -- | -- |

United States Patent Office 3,022,505
Patented Feb. 20, 1962

3,022,505
LOADED DOUBLE-FOLDED SLOT ANTENNA
Glenn A. Scharp, Norco, Calif., assignor to the United States of America as represented by the Secretary of the Navy
Filed Mar. 29, 1960, Ser. No. 18,453
4 Claims. (Cl. 343—767)
(Granted under Title 35, U.S. Code (1952), sec. 266)

The invention herein described may be manufactured and used by or for the Government of the United States of America for governmental purposes without the payment of any royalties thereon or therefor.

The present invention relates to slot antennas and more particularly to a new and improved folded slot antenna and a new and improved loaded double-folded slot antenna.

The purpose of the antenna of the present invention is to efficiently radiate or receive electromagnetic energy at a frequency whose wavelength is greater than twice the antenna length while presenting a broad choice of desirable impedance to the generator or receiver. This invention is also related to copending application for "Double-Folded Slot Antenna" by Glenn A. Scharp, Serial No. 18,454, filed March 29, 1960, now abandoned.

The old method of radiation or reception was accomplished by means of a simple slot antenna. The simple slot had a narrower bandwidth and occupied more space than the antenna of this invention.

The present invention provides a double-folded slot antenna which is similar, in part, to the old simple slot but which has two ungrounded parallel plates placed inside of and flush with the slot surface. This antenna is also an improvement over the folded slot antenna disclosed in U.S. Patent 2,751,589.

The present invention also provides a loaded double-folded slot antenna which is similar, in part, to an old dumbbell-loaded slot but which has two ungrounded parallel plates placed inside of and flush with the slot surface. This antenna is an improvement over the dumbbell loaded slot antenna disclosed in U.S. Patent 2,507,528. The loaded double-folded slot antenna of this invention has a greater bandwidth, shorter length and a wide choice of feedpoint impedances obtained by varying the widths of the center plates; it also has the ability to feed half of it over a ground plane if desired.

It is an object of the invention, therefore to provide a new and improved loaded double-folded slot antenna.

It is another object of the invention to provide a loaded double-folded slot antenna which operates at a frequency whose wavelength is more than twice the antenna length.

Still another object of the invention is to provide a double-folded slot antenna.

A further object of the invention is to provide a loaded folded slot antenna which can be bisected and half of it fed over a ground plane.

It is a still further object of the invention to provide a double-folded slot antenna which operates at a frequency whose wavelength is more than twice the antenna length.

Other objects and many of the attendant advantages of this invention will become readily appreciated as the same becomes better understood by reference to the following detailed description when considered in connection with the accompanying drawings wherein:

FIGURE 3 is a table showing statistics for the antenna of FIGURE 1;

FIGURE 8 is a table showing statistics for the antenna of FIGURE 6;

Figure 1:
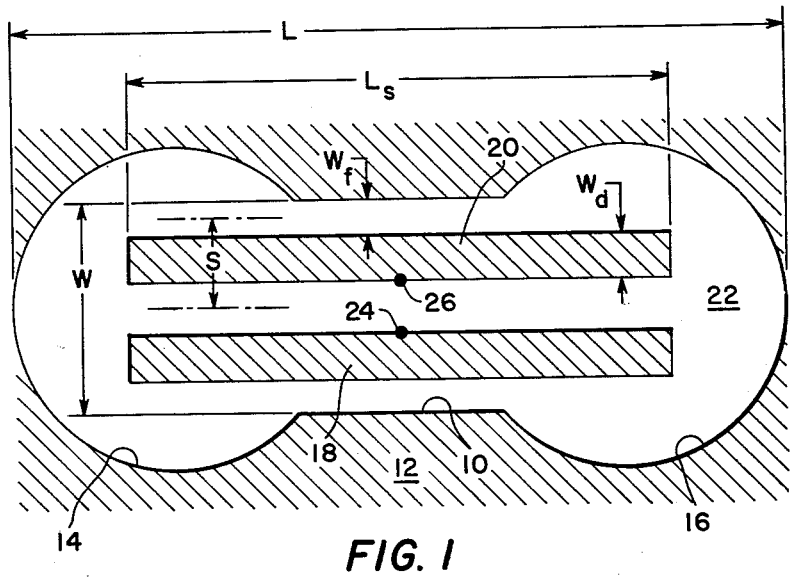
FIGURE 1 is a plan view of a preferred embodiment of the invention, showing a dumbbell-loaded double-folded slot antenna.

The loaded double-folded slot antenna of the present invention consists of a slot 10 in a conducting sheet 12 and loaded at opposite ends by means of circular apertures 14 and 16, the resulting slot being in the shape of a dumbbell. Two ungrounded parallel plates 18 and 20 are positioned inside and flush with the slot surface. The two metal strips 18 and 20 are supported in place in the plane of slot 10 and circular apertures 14 and 16 by a dielectric material 22, such as polystyrene or Teflon for example. Power is fed through a balanced transmission line, not shown, to adjacent feedpoints 24 and 26 provided on parallel plates 18 and 20, respectively, as shown in FIGURE 1. This antenna can be bisected and fed with a coaxial cable through a ground plane, if desired.

Impedance curves have been made for this antenna for chosen values of $W_f/W_d$ and S, where $W_f$ is the width of the folded (outside) element, $W_d$ is the width of the driven (center) element, and S is the distance between the centers of the folded and driven elements, as indicated on the drawings. L is overall length of slot 10, W is the width of the slot, and $L_s$ is the length of the parallel plates 18 and 20.

Figure 2:
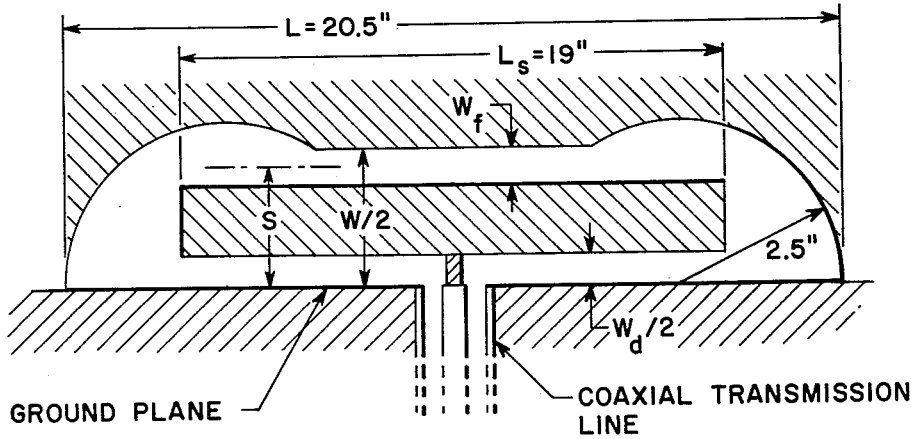
FIGURE 2 shows a half dumbbell-loaded double-folded slot antenna over a ground plane, as used for impedance measuring.

The impedance measuring method used for the dumbbell-loaded double-folded slot antenna was the half-antenna-over-ground-plane system shown in FIGURE 2. All impedances are one-half the impedances for a complete antenna in free space. The table of FIGURE 3 shows limitations that are present on S and $W_f/W_d$. The slot length L and the dumbbell diameter are given with the table along with the ratio of slot length to slot width $L/W$. For the antenna used by way of example, slot length $L=20.5$ inches and the dumbbell diameter=5 inches. Some important conclusions drawn from this table for a dumbbell-loaded double-folded slot antenna are:

Increasing value of $W_f/W_d$ decreases the second resonant frequency ($f_{02}$) slightly;

The size of S has no effect on the second resonant frequency ($f_{02}$);

A general reduction in the second resonant radiation resistance ($R_{02}$) occurs when increasing $W_f/W_d$; and The range of bandwidth for 90% power radiated (voltage standing wave ratio VSWR=1.9) for $Z_0=R_{02}$ line feeding the slot is from 10% to 22%, $Z_0$ being the impedance at resonant frequency.

Figure 4:
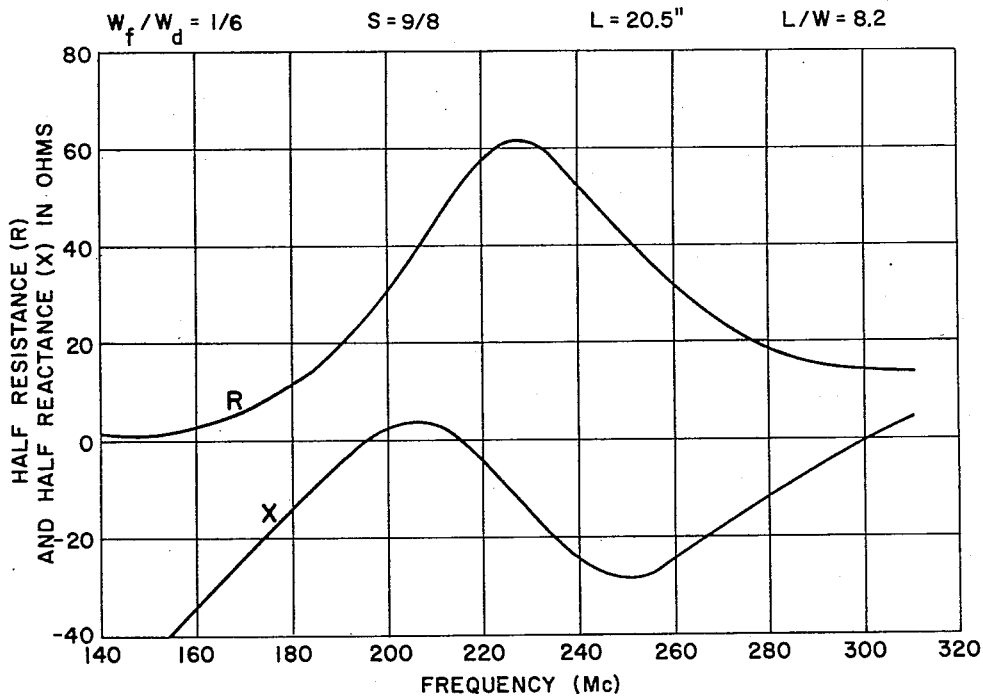
FIGURE 4 is a graph showing the variation of impedance (resistance and reactance) with frequency for a select dumbbell-loaded double-folded slot antenna of the present invention.
Figure 5:
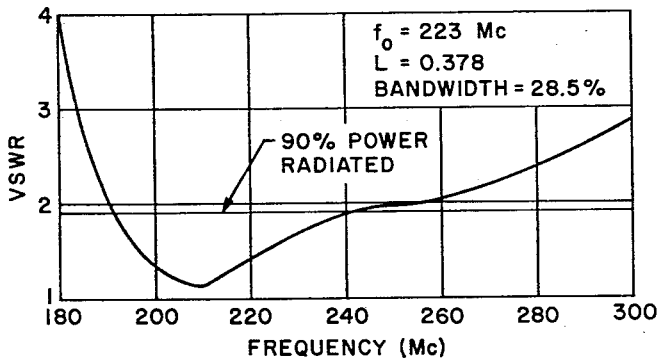
FIGURE 5 is a curve showing the variation of VSWR (voltage standing wave ratio) with frequency for a select dumbbell-loaded double-folded slot antenna of the present invention.

The reactance (X) remained capacitive throughout the desired frequency range (below $0.500\lambda$) for values of $W_f/W_d$ greater than 0.17, as shown by the reactance component of the impedance curves of FIGURE 4. In the table of FIGURE 3, the bandwidth for 90% power radiated was determined by using a transmission line feed impedance of $Z_0=R_{02}$. However, by using a compromising value of impedance ($Z_0$) between the first resonant radiation resistance ($R_{01}$) and the second resonant radiation resistance ($R_{02}$), a bandwidth of 24% can be obtained. By choosing the operating frequency in the middle of the band, the bandwidth shown in FIGURE 5 can be obtained. For the curves of FIGURES 4 and 5 values of $W_f/W_d=1/6$, $S=9/8$ inches, $L=20.5$ inches and $L/W=8.2$ were used. With dumbbell loading of a double-folded slot antenna wavelength shortening to $0.38\lambda$ can be obtained at 28.5% bandwidth.

Figure 6:
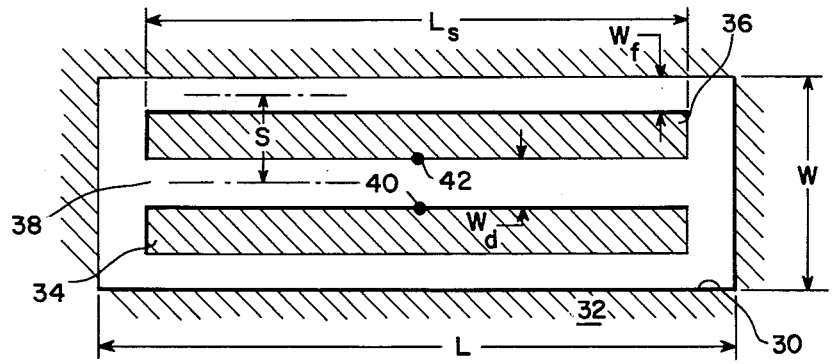
FIGURE 6 is a plan view of another embodiment of the present invention, showing a double-folded slot antenna.

The double-folded slot antenna of the present invention consists of a slot 30 in a conducting sheet 32 with two ungrounded parallel plates 34 and 36 positioned inside and flush with the slot surface. The two metal strips 34 and 36 are supported in place in the plane of slot 30 by a dielectric material 38, such as polystyrene or Teflon for example. Power is fed through a balanced transmission line, not shown, to adjacent feed points 40 and 42 provided on parallel plates 32 and 36, respectively, as shown in FIGURE 6. This antenna can be bisected and fed with a coaxial cable through a ground plane, if desired.

Impedance curves may be made for this antenna for a series of value of $W_f/W_d$ and S, where $W_f$ is the width of the folded (outside) element, $W_d$ is the width of the driven (center) element, and S is the distance between the centers of the folded and driven elements, as indicated on the drawings. L is the length of the slot 30, W is the width of the slot and $L_s$ is the length of the parallel plates 34 and 36.

Figure 7:
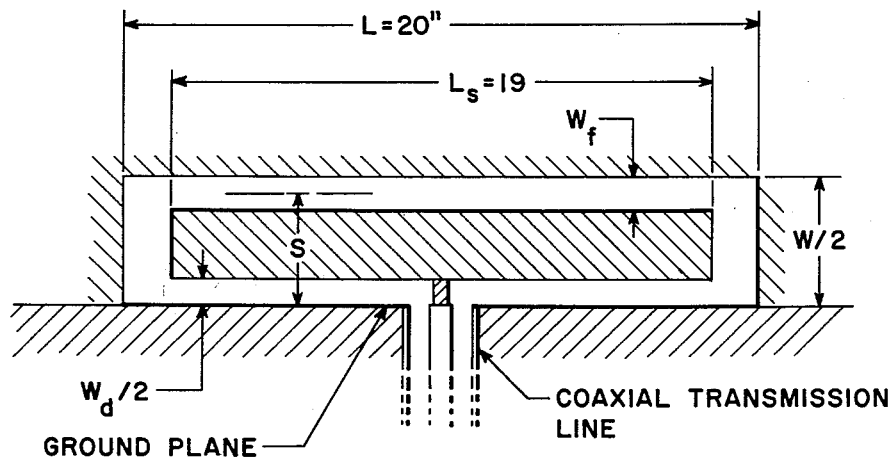
FIGURE 7 shows a half double-folded slot antenna over a ground plane, as used for impedance measuring.

The impedance measuring method used for the double-folded slot antenna was the half-antenna-over-ground-plane system shown in FIGURE 7. All impedances are one-half the impedances for a complete antenna in free space. The table of FIGURE 8 shows the limitations that are present on S and $W_f/W_d$. The slot length L and the ratio of slot length to the slot width $L/W$ are given with the table. For the embodiment given by way of example, slot length $L=20$ inches and the ratio of slot length to slot width $L/W=8$. Some important conclusion drawn from this table for a double-folded slot antenna are:

$W_f/W_d$ and S have little effect on the second resonant frequency ($f_{02}$);

As S is reduced the second resonant radiation resistance ($R_{02}$) increases slightly;

The second resonant radiation resistance ($R_{02}$) decreases with increasing $W_f/W_d$; and The range of bandwidth for 90% power radiated (voltage standing wave ratio VSWR=1.9) for $Z_0=R_{02}$ line feeding the slot is from 14% to 27%; $Z_0$ being the impedance at resonant frequency.

Figure 9:
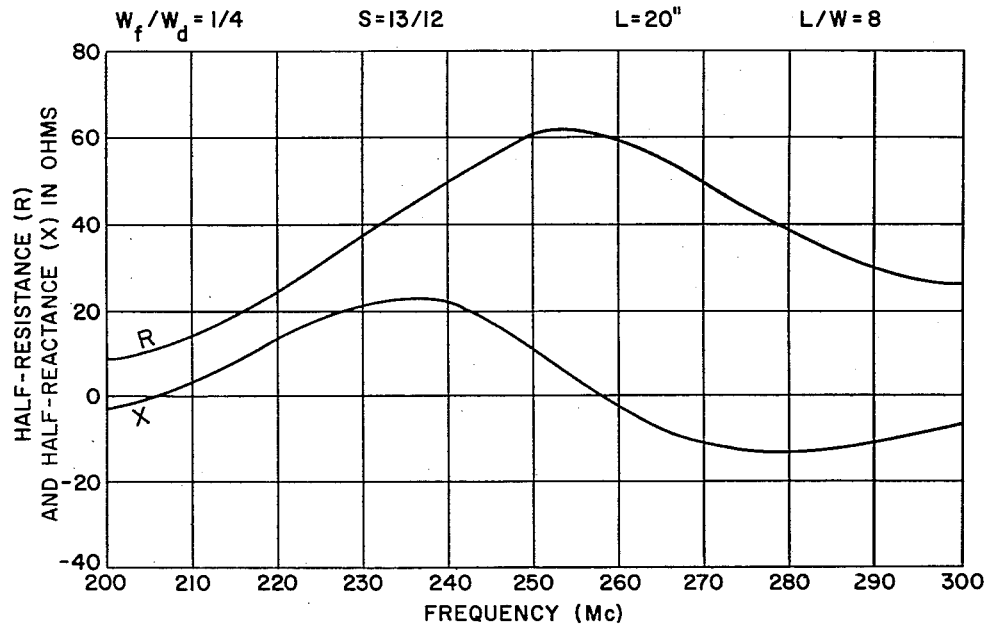
FIGURE 9 is a graph showing the variation of impedance (resistance and reactance) with frequency for a select double-folded slot antenna of the present invention.
Figure 10:
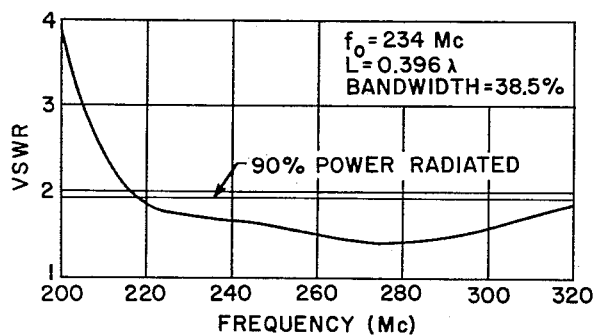
FIGURE 10 is a curve showing the variation of VSWR (voltage standing wave ratio) with frequency for a select double-folded slot antenna of the present invention.

The reactance (X) component of the impedance curves, for double-folded slots in general, crosses the zero axis twice between $.250\lambda$ (148 mc.) and $0.500\lambda$ (296 mc.), which is desirable for broad-band applications; and example is shown in FIGURE 9. In the table of FIGURE 8, the bandwidth for 90% power radiated was determined using a transmission line feed impedance of $Z_0=R_{02}$. However, by using a compromising value of impedance ($Z_0$) between the first resonant radiation resistance ($R_{01}$) and the second resonant radiation resistance ($R_{02}$), bandwidths of 34.5% to 38.5% can be obtained. The curve of FIGURE 10 is shown for a bandwidth of 38.5%. By choosing the operating frequency in the middle of the band, bandwidths from 34.5% to that shown in FIGURE 10 can be obtained. For the curves of FIGURES 9 and 10 values of $W_f/W_d=1/4$, $S=13/12$ inches, $L=20$ inches and $L/W=8$ were used.

A double-folded slot, as in the present invention, can replace a simple slot in many applications and will be particularly advantageous where shorter wave length ($0.40\lambda$ to $0.45\lambda$) and higher bandwidth (34.5% to 38.5%) are desired.

Obviously many modifications and variations of the present invention are possible in the light of the above teachings. It is therefore to be understood that within the scope of the appended claims the invention may be practiced otherwise than as specifically described.

What is claimed is:

1. A broadband double-folded slot antenna comprising a conducting plane having a rectangular slot therein, two flat ungrounded and spaced-apart parallel rectangular strips of conducting material slightly shorter than the length of said slot symmetrically disposed side-by-side within and lying in the plane of said slot, said parallel strips being supported within and parallel to the longer sides of the rectangular slot by a dielectric material of suitable dielectric constant, two feedpoints symmetrically positioned on said flat parallel strips for connection with suitable transmission line, said antenna being resonant and operable to efficiently receive and radiate electromagnetic energy at a frequency whose wavelength is more than twice the antenna length.

2. An antenna as in claim 1 wherein said rectangular slot has a circular aperture at each end thereof thus giving said slot a dumbell configuration.

3. A broadband double-folded slot antenna comprising a plane of conducting material having a rectangular slot therein, two flat ungrounded parallel strips of conducting material slightly shorter than the length of said rectangular slot symmetrically disposed side-by-side inside of and lying in the plane of and parallel to the longer sides of said rectangular slot, two feedpoints symmetrically positioned on said flat parallel strips for connection with suitable transmission line, said antenna being resonant and operable to efficiently receive and radiate electromagnetic energy at a frequency whose wavelength is more than twice the antenna length.

4. An antenna as in claim 3 wherein said rectangular slot has a circular aperture at each end thereof thus giving said slot a dumbbell configuration.

References Cited in the file of this patent

UNITED STATES PATENTS

| | | |
|---|---|---|
| 2,507,528 | Kandoian | May 16, 1950 |
| 2,946,055 | Faflick | July 19, 1960 |
| 2,972,147 | Wilkinson | Feb. 14, 1961 |

FOREIGN PATENTS

| | | |
|---|---|---|
| 655,045 | Great Britain | July 11, 1951 |
| 1,012,833 | France | July 17, 1952 |

OTHER REFERENCES

"Slot-Antenna Array for Missiles and Aircraft" Electronics, February 27, 1959, pages 56–57 relied on.

"Slot Feeders and Slot Aerials," T.I.E.E. (British), vol. 93, part IIIA, No. 4, pages 617–618 relied on.